Sept. 18, 1951  J. W. WOOLF ET AL  2,568,103
MECHANICAL INTERLOCK
Filed July 20, 1946  2 Sheets-Sheet 1
Fig. 1
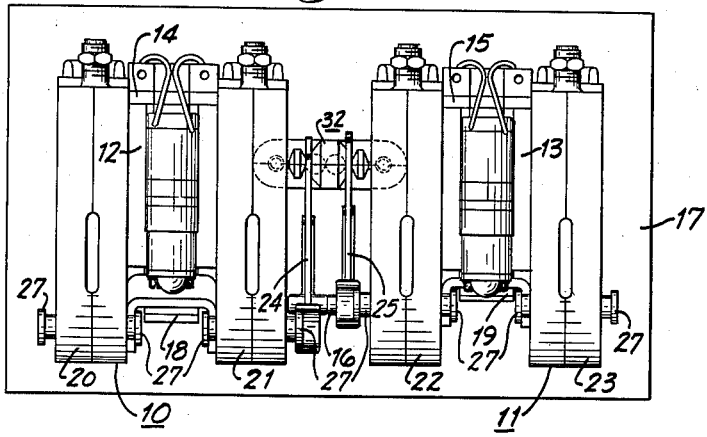
Fig. 2
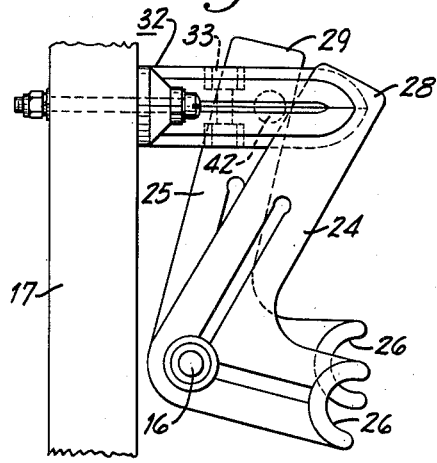
Fig. 3
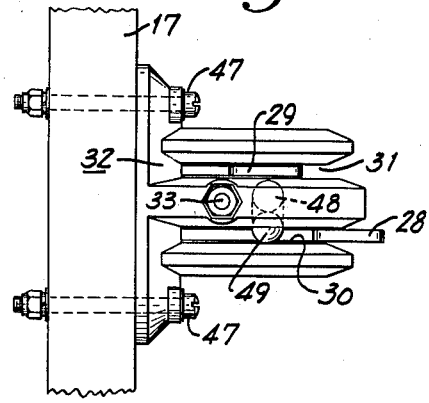
Fig. 4
INVENTOR.
JOHN D RUSSELL
AND BY JAMES W WOOLF Sept. 18, 1951   J. W. WOOLF ET AL   2,568,103
MECHANICAL INTERLOCK Filed July 20, 1946   2 Sheets-Sheet 2

INVENTOR.
JOHN D. RUSSELL
BY JAMES W. WOOLF
William D Carothers
Their Atty.

Patented Sept. 18, 1951

2,568,103

UNITED STATES PATENT OFFICE 2,568,103

MECHANICAL INTERLOCK

James W. Woolf, Franklin, and John D. Russell, Victory Heights, Pa., assignors to Joy Manufacturing Company, Pittsburgh, Pa., a corporation of Pennsylvania Application July 20, 1946, Serial No. 685,268

11 Claims. (Cl. 74—483)

This invention relates generally to mechanical interlocks and more particularly to mechanical interlocks for use between devices which have movement in performing opposite functions.

The mechanical interlocks comprising this invention are particularly adaptable for use between the armatures of circuit controllers.

Mechanical interlocking devices such as the oscillating beam type, which are commonly employed between the armatures of relays or contactors or controllers, frequently permit one contactor to close when the contacts of the opposite contactor are just breaking the circuit which frequently results in heavy arcing or shorting the circuit. It is the purpose of the invention to overcome failures of this character and to provide an interlock that is not sensitive to vibration and is positive in blocking the operation of the opposite functioning member.

The principal object of this invention is the provision of a mechanical interlock that prevents the operation of one device until the other device attains its full inoperative position.

Another object is the provision of a mechanical interlock having positive control over the operation of the devices being interlocked.

Another object is the provision of a mechanical interlock having independent actuators controlled by a lock means common to both.

Another object is the provision of a compact and positive interlock arranged to block the movement of one device before a component device is fully retracted.

Another object is the provision of a molded interlock made of duplicated half parts providing a chamber for a movable blocking member.

Another object is the provision of an interlock arranged to control members which are disposed at right angles to each other.

Other objects and advantages appear in the following description and claims.

Practical embodiments illustrating the principles of this invention are shown in the accompanying drawing wherein:

Fig. 1 is a view in front elevation of two contactors the armatures of which are mechanically interlocked.

Fig. 2 is an enlarged view in side elevation of the interlock shown in Fig. 1 and its blade members.

Fig. 3 is a top plan view of the structure shown in Fig. 2.

Fig. 4 is a view showing one-half of the interlock member shown in Figs. 2 and 3.

Figure 5:
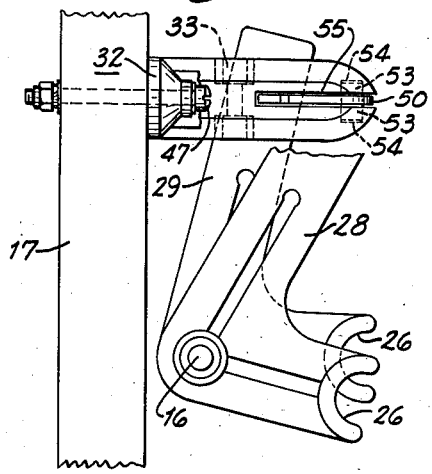
Fig. 5 is an enlarged view in side elevation with parts broken away of an interlock having a modified operating member.

Referring to Fig. 1 the relays or contactors 10 and 11 are provided with their respective operating coils 12 and 13 mounted in the frames 14 and 15 of magnetic material and which extends from the top of the core of the coil down the back. The lower end of each frame is provided with a bearing to receive the single shaft 16. These frames are employed for mounting the contactors on the panel 17 and they are accurately positioned on the panel in order to properly align the bearing to receive and hold the shaft 16 in a horizontal plane. The armatures 18 and 19 of each controller are pivotally supported on the shaft 16 and are arranged to be drawn to the core of the coil when energized and when de-energized they move away from the core a limited distance.

The armature of each contactor shown carries two contacts; armature 18 has a contact operable in each of the shields 20 and 21 and armature 19 has two in the shields 22 and 23. These contacts are spring-biased and produce a load of approximately twelve pounds to fully close the contacts against the contact spring pressure. These contactors may be employed in circuits such as the reversing circuit of a direct current series wound motor wherein the contacts of each contactor are placed in the opposite legs of a bridge circuit including the armature of the motor. Thus if the contacts of one contactor are just breaking or arcing when the contacts of the other contactor are closed the armature is shorted out of the circuit and an increased current flow passes through the field. In this character of circuit such a condition prolongs the arcing, causing damage to the contacts as well as to the motor.

To avoid this difficulty two bell-crank levers 24 and 25 are pivotally supported on the shaft 16. These levers are preferably made of insulating material and are shown in Fig. 2. Their short arms are provided with the sockets 26 which fit on the stub shafts 27 of insulating material that project from the sides of their respective armatures. Thus the movement of the armatures of the contactors from the de-energized position as indicated by the bell-crank 24 to the position indicated by the bell-crank 25 represents the movement of the armatures from their de-energized position to the energized position.

The long arms 28 and 29 of these bell-crank levers are the blade members of the mechanical interlock. The blade 28 operates within the slot 30 and the blade 29 operates in the slot 31 of the interlock block 32. This block is made in two halves which are made from the same mold and are fastened together by the bolt 33. As shown in Fig. 4 each half block 34 has a plain flat face 35 and consists of the base section 36 and the three outwardly projecting fingers 37, 38 and 39 which form the slots 30 and 31. The finger 37 has a lug 40 molded on its flat face and the finger 39 has a corresponding recess 41 molded in its flat face for receiving a lug similar to that shown at 40. The central finger 38 has a semi-cylindrical recess 42 disposed transversely thereof and extending from one side of the finger to the other. This finger also has a hole 43 molded therethrough for receiving the clamping bolt 33 that holds the two half sections together.

The opposite ends of the base 36 have two semi-cylindrical grooves 44 and 45 which mate with similar grooves to provide holes to receive the panel mounting screws 47 shown in Figs. 2 and 3.

The grooves 42 are made to provide a cylindrical chamber to receive the ball members 48 and 49 which may be plastic or steel. When the balls are placed in the chamber formed by the grooves 42 and the clamping nut and bolt 33 fasten the two halves together the lugs 40 of each half mesh with their corresponding recess 41 and thus provide a unitary interlocking block. The ball members are just large enough in diameter to completely block one slot while the other slot is open. Thus as shown in Figs. 2 and 3 the ball 49 blocks the blade 28 from entering any further into the slot 30 while the blade 29 occupies the slot 31 beyond the ball members. Since the blades practically fill their respective slots and if they are unoccupied by reason of the fact that both contactors are de-energized the first blade to enter its slot strikes the curved side of the ball and forces both balls to block the opposite slot and prevent the opposite blade from entering its slot.

This mechanical interlock provides a complete lockout at two-tenths of the stroke movement which is not possible with the walking beam type. This is an important feature of this invention. With the structure shown the contacts of one contactor are fully cleared with the arc out before the other contactor can close its armature.

Figure 6:
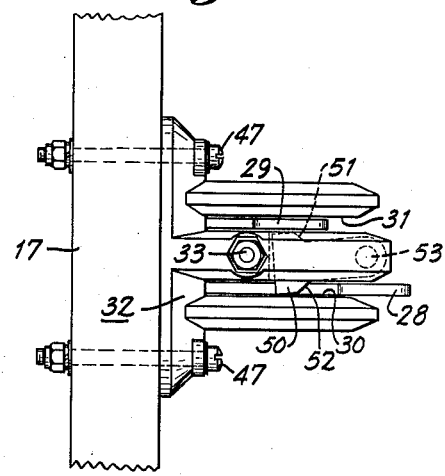
Fig. 6 is a top plan view of the structure shown in Fig. 5.

In Figs. 5 and 6 the structure is modified by replacing the ball members with a sector or swinging cam 50 which is a molded piece having opposite shoulders 51 and 52 similar to the ball surfaces they replace and is provided at its outer or pivot end with oppositely extending studs 53 that are pivotally received in the bearing pockets 54. The center fingers are cut away as shown at 55 to provide clearance in which the sector cam 50 may swing. This type of blocking member in this interlocking structure has the advantage in that the center of pivotal motion is spaced from the shoulder engaging portions which require less energy for the blade members to move or swing the cam than it does to move the blocking ball members. This is an important feature of this invention.

Figure 7:
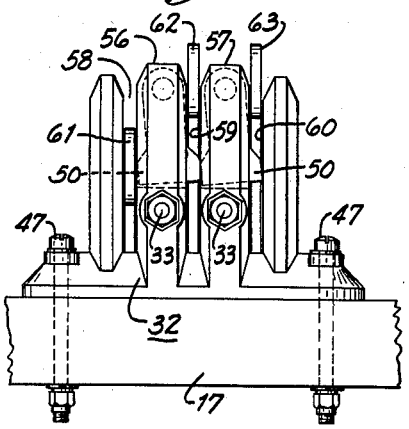
Fig. 7 is a top plan view of a modified interlock for use with three blades.

In the modification shown in Fig. 7 there are two intermediate finger members 56 and 57 which form three independent slots 58, 59 and 60 for the blades 61, 62 and 63 respectively.

The three contactors can be mounted in a row using a common shaft and the contactor remote of the interlocking block may have its armature fixed to the shaft and the blade 62 would also be fixed to the shaft to provide its interlocking function. Or the blade 62 may be operated by a contactor mounted above or below the other two contactors. By using these or other arrangements of the controllers or contactors on the panel three relays may thus be interlocked so that when any one of this group of three is energized it mechanically blocks out the operation of the other two relays. This is an important feature of this invention.

Figure 8:
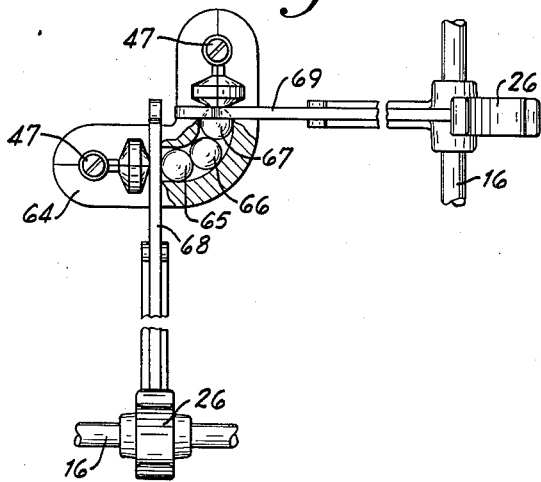
Fig. 8 is a view in section of a modified interlock for use with blades disposed at right angles to one another.

The modification of Fig. 8 is for interlocking two devices, the shafts of which are disposed at right angles to one another. Here the interlocking block 64 is not made up of halves made from the same mold but the principle is the same and whether a swinging sector or the three ball members 65, 66 and 67 are employed the blade member 68 can block out the blade member 69 in the same manner as that previously described.

We claim:

1. In a mechanical interlock for use on a panel between armatures of electromagnetic controllers having different functions in electrical circuits, the combination of a body mounted on the panel, a plurality of projections extending outwardly from the body and spaced from each other to form a plurality of slots, a blade for each slot mounted to occupy its respective slot to move with the armature of each controller and descend into its respective slot when the armature is energized, free body shiftable means having one dimension equal to the width of one slot and one projection, and means to support the shiftable means on an intermediate projection to block the entry of a blade into its slot when the adjacent slot is occupied by its blade.

2. In a mechanical interlock for use on a panel between the armatures of electromagnetic controllers having alternate functions in electrical circuits, the combination of a body mounted on the panel, three projections extending outwardly from the body in a common plane and spaced from each other to form two slots, a blade for each slot mounted to occupy its respective slot to move with the armature of each controller and descend into its respective slot when the armature is energized, free body shiftable means having one dimension equal to that of one slot and the intermediate projection, and means to support the shiftable means on the intermediate projection to block the entry of one blade into its slot when the other blade occupies the other slot.

3. In a mechanical interlock for use on a panel between armatures of electromagnetic controllers having different functions in electrical circuits, the combination of a body arranged to be mounted on the panel, a plurality of projections extending outwardly from the body and spaced from each other to form a plurality of slots, a blade arranged to move with the armature of each controller and descend into its respective slot when the armature is energized, adjacent slots being connected by a hole passing through the projection between said slots, and a plurality of balls the diameter of each of which is greater than the width of a slot and mounted to move in the hole, the sum of the diameters of the balls being equal to the length of the hole plus the width of one slot to block the entry of a blade into its slot when the adjacent slot is occupied by its blade.

4. In a mechanical interlock for use on a panel between armatures of electromagnetic controllers having different functions in electrical circuits, the combination of a body mounted on the panel, a plurality of projections extending outwardly from the body and spaced from each other to form a plurality of slots, a blade for each slot mounted to occupy its respective slot to move with the armature of each controller and descend into its respective slot when the armature is energized, a sector pivotally supported on the projection between adjacent slots, the broad dimension of the sector being equal to the sum of the widths of one slot and the projection on which it is pivoted to block the entry of a blade into its slot when the adjacent slot is occupied.

5. In a mechanical interlock for use on a panel between armatures of electromagnetic controllers having different functions in electrical circuits, the combination of a body mounted on the panel, a plurality of projections extending outwardly from the body and spaced from each other to form a plurality of slots, a blade for each slot mounted to occupy its respective slot to move with the armature of each controller and descend into its respective slot when the armature is energized, a chamber connecting adjacent slots through a projection, a triangularly shaped sector pivotally mounted in said chamber, the broad dimension of the free end of the sector being equal to the sum of the widths of one slot and the chamber to block the entry of a blade into its slot when the adjacent slot is occupied.

6. In a mechanical interlock for use on a panel between aligned armatures of spaced electromagnetic controllers, the combination of a single shaft for pivotally supporting the armatures of said controllers, a bell crank lever for each controller pivoted on said shaft and having one leg secured to its respective armature and the other leg in the form of a blade, a body mounted on the panel above the blades, three aligned projections extending outwardly from the body and spaced from each other to form slots occupied by said blades and which descend into said slots when their respective armatures are raised, free body shiftable means carried by the intermediate projection and arranged to extend into either slot to block the entry of one blade into its slot when the adjacent blade occupies its slot.

7. In a mechanical interlock of the character described the combination of a pair of matched bodies each having a base with three outwardly extending projections spaced from each other to form slots therebetween, one side of each body having a flat face, a transverse depression in the intermediate projection extending from one slot to the other, means for securing the flat faces of the two bodies together with their slots and depressions mating in alignment, and free body shiftable means carried in the mating depressions for blocking one slot when the other slot is open.

8. The structure of claim 7 characterized in that the free body shiftable means carried by the mating depressions is a plurality of spheres.

9. The structure of claim 7 characterized in that the free body shiftable means carried by the mating depressions is a pivoted sector.

10. In a mechanical interlock of the character described the combination of two identical molded bodies each having a base with three outwardly extending projections spaced from each other to form slots therebetween, one side of each body having a flat face, a transverse depression in the flat face of the intermediate projections extending from one slot to the other, grooves in the flat faces of the base of each body, a lug on the flat face of the first projection and a mating indentation in the flat face of the third projection of each body, means for securing the flat faces of the two bodies together with the lugs and indentations holding the slots and grooves mating in alignment, free body shiftable means carried by the mating depressions for blocking one slot when the other slot is open, and means extending through the mating grooves to secure the mechanical interlock to a panel.

11. In a mechanical interlock of the character described, the combination of a pair of matched bodies each having a base with a plurality of extending projections spaced from each other to form slots therebetween, one side of each body having a flat face, a transverse depression in the intermediate projections of each body extending from one slot to the other on either side thereof, means for securing the flat faces of the two bodies together with their slots and depressions mating in alignment, and free body shiftable means carried in the mating depressions for blocking one slot on one side of an intermediate projection when the slot on the other side of said intermediate projection is open.

JAMES W. WOOLF.
JOHN D. RUSSELL.

REFERENCES CITED

The following references are of record in the file of this patent:

UNITED STATES PATENTS

| Number | Name | Date |
|---|---|---|
| 347,494 | May | Aug. 17, 1886 |
| 400,943 | Potter | Apr. 9, 1889 |
| 536,414 | Bailey | Mar. 26, 1895 |
| 1,168,218 | Merritt | Jan. 11, 1916 |
| 1,205,877 | Evers | Nov. 21, 1916 |
| 1,850,761 | Manypenny | Mar. 22, 1932 |
| 2,149,865 | Packer | Mar. 7, 1939 |

FOREIGN PATENTS

| Number | Country | Date |
|---|---|---|
| 27,146 of 1913 | Great Britain | Dec. 17, 1914 |